(12) United States Patent
Wang

(10) Patent No.: US 6,371,570 B1
(45) Date of Patent: Apr. 16, 2002

(54) SECURING MEMBER FOR A STEEL RING OF A WHEEL COVER

(76) Inventor: Johnny Wang, No. 11, Alley 18, Lane 44, Chungyi Street, Yung Kang, Tainan Hsien (TW)

( * ) Notice: Subject to any disclaimer, the term of this patent is extended or adjusted under 35 U.S.C. 154(b) by 0 days.

(21) Appl. No.: 09/707,976

(22) Filed: Nov. 8, 2000

(51) Int. Cl.⁷ .................................................. B60B 7/12
(52) U.S. Cl. .................................................. 301/37.33
(58) Field of Search .......................... 301/37.33, 37.32, 301/37.31, 37.102, 37.42, 37.101

(56) References Cited

U.S. PATENT DOCUMENTS

| | | | | |
|---|---|---|---|---|
| 4,458,952 A | * | 7/1984 | Foster et al. ............. | 301/37.32 |
| 4,709,967 A | * | 12/1987 | Sakamoto | |
| 4,735,460 A | * | 4/1988 | Tomida et al. ........... | 301/37.32 |
| 4,822,109 A | * | 4/1989 | Feria ....................... | 301/37.32 |
| 5,161,860 A | * | 11/1992 | Sakane .................... | 301/37.33 |
| 5,700,062 A | * | 12/1997 | Wang ...................... | 301/37.33 |
| 5,718,484 A | * | 2/1998 | Sheu ....................... | 301/37.33 |
| 5,752,745 A | * | 5/1998 | Sheu ....................... | 301/37.32 |
| 5,988,762 A | * | 11/1999 | Asada et al. ............. | 301/37.31 |
| 6,033,033 A | * | 3/2000 | Sheu ....................... | 301/37.33 |
| 6,099,082 A | * | 8/2000 | Wang ...................... | 301/37.33 |
| 6,139,114 A | * | 10/2000 | Wang ...................... | 301/37.33 |

\* cited by examiner

*Primary Examiner*—S. Joseph Morano
*Assistant Examiner*—Long Bao Nguyen
(74) *Attorney, Agent, or Firm*—Rosenberg, Klein & Lee

(57) ABSTRACT

A securing member for a steel ring of a wheel cover has a main body, two lateral supporting plates and a confining block. The main body projects from an inner side of the wheel cover, and has an engaging protrusion on an inner side of a top portion. The lateral supporting plates each extends inwardly of the wheel cover from a respective side of the main body, and has a gap on a top to form a receiving space between same and the engaging protrusion. The steel ring can be located in the receiving space. The confining block is formed on the inner side of the main body to support the steel ring.

1 Claim, 3 Drawing Sheets

SECURING MEMBER FOR A STEEL RING OF A WHEEL COVER

BACKGROUND OF THE INVENTION

The present invention relates to a wheel cover for a car wheel, and particularly to one which has securing members shaped such that a steel ring can be securely connected thereto.

Nowadays, most cars have a wheel covers fitted to the wheels such that the wheels can have a more pleasing appearance. The wheel cover has securing members spaced apart on the edge for permitting a steel ring to be fitted thereto. Thus, the wheel cover can be fitted onto the wheel by engaging the steel ring and an outer side protrusion of the securing member with the inner side of the wheel.

Referring to FIG. 4, a conventional securing member 10 of a steel ring has an upper confining protrusion 101, and a lower confining protrusion 102 on an inner side; the upper and the lower confining protrusions 101, 102 has a space in between substantially same as the thickness of the steel ring (not shown) of the wheel cover. The steel ring is connected to the wheel cover by depressing same into the space between the upper and the lower confining protrusions 101, 102.

However, the steel ring is found to easily fall off the confining protrusions 101, 102 and move to lower side of the lower confining protrusion 102 when same is depressed hard for connection with the wheel cover, or under violent movement.

Referring to FIG. 5, another conventional securing member of a steel ring has a main body 20 and two confining plates 30.

The main body 20 has an engaging block 201 on a top end of the inner side. The confining plates 30 are each provided on a respective side of the main body 20 with apertures 202 formed between same and the main body 20. The confining plates 30 each has a gap 30 on a top end.

The steel ring of the wheel cover is fitted onto between the engaging block 201 and the gaps 301 of the confining plates 30.

However, it is found that the securing member has an disadvantage that the steel ring is likely to fall into the apertures 202 when the steel ring is depressed hard in assembling because the main body 20 is elastic. Consequently, the main body 20 would be deformed and break. Moreover, because the main body 20 is only connected to the wheel cover from a bottom, the strength of connection is not optimal.

SUMMARY OF THE INVENTION

Therefore, it is a main object of the present invention to provide a securing member for a steel ring of a wheel cover which is strong, and can help the steel ring located in position securely.

The securing member of the present invention includes a main body, two lateral supporting plates and a confining block.

The main body projects from an inner side of the wheel cover, and has an engaging protrusion on an inner side.

The lateral supporting plates extend inwardly of the wheel cover from two sides of the main body. The lateral supporting plates each has a gap on a top such that a receiving space is formed between same and the engaging protrusion for the steel ring.

The confining block is formed on the inner side of the main body to support the steel ring.

The main body is connected to the wheel cover from a bottom as well as two sides of a lower end portion to have a relatively strong connection.

BRIEF DESCRIPTION OF THE DRAWINGS

This invention will be better understood by referring to the t accompanying drawings, wherein.

DESCRIPTION OF THE PREFERRED EMBODIMENT

Figure 1:
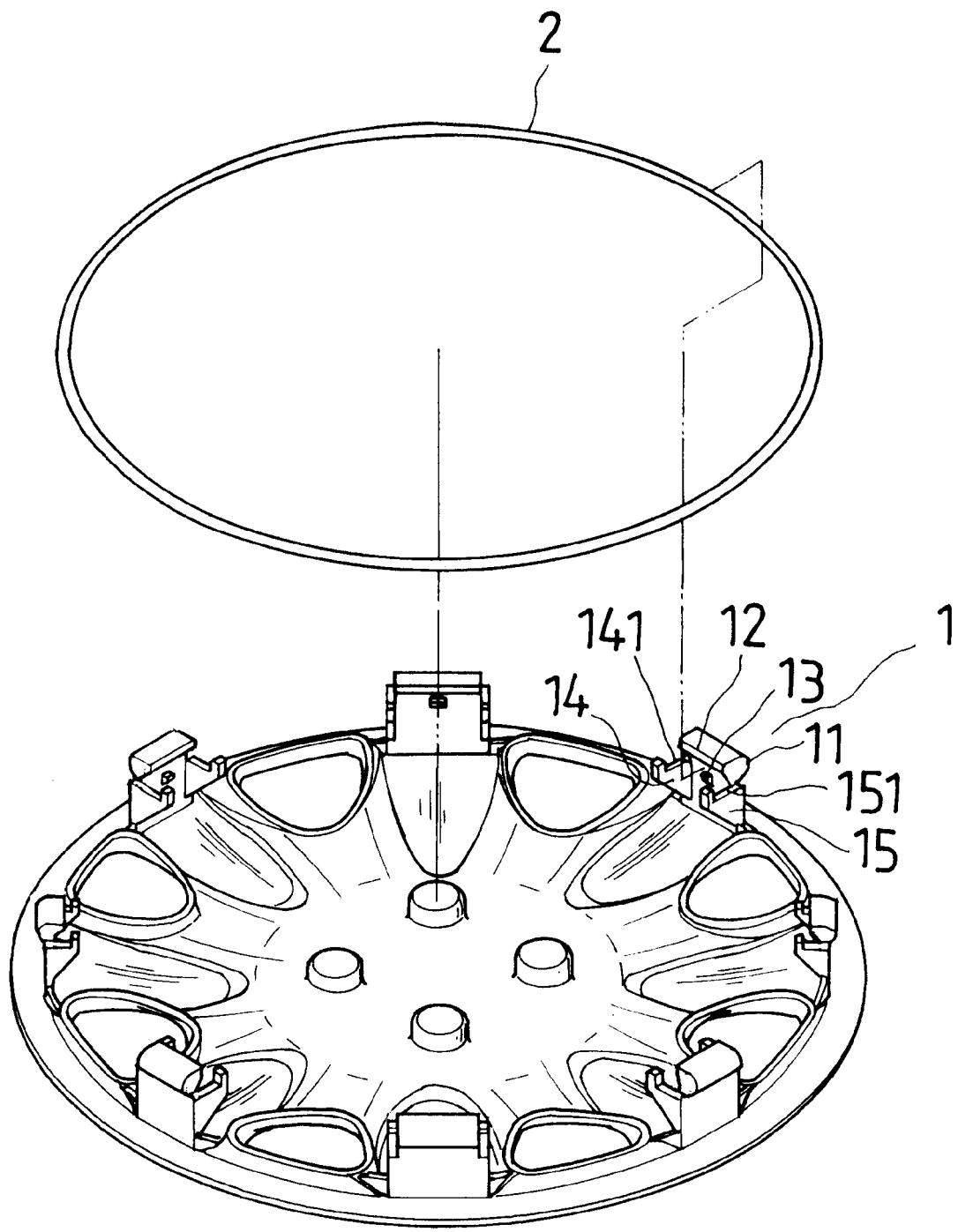
FIG. 1 is an exploded perspective view of a wheel cover of a car wheel according to the present invention.
Figure 3:
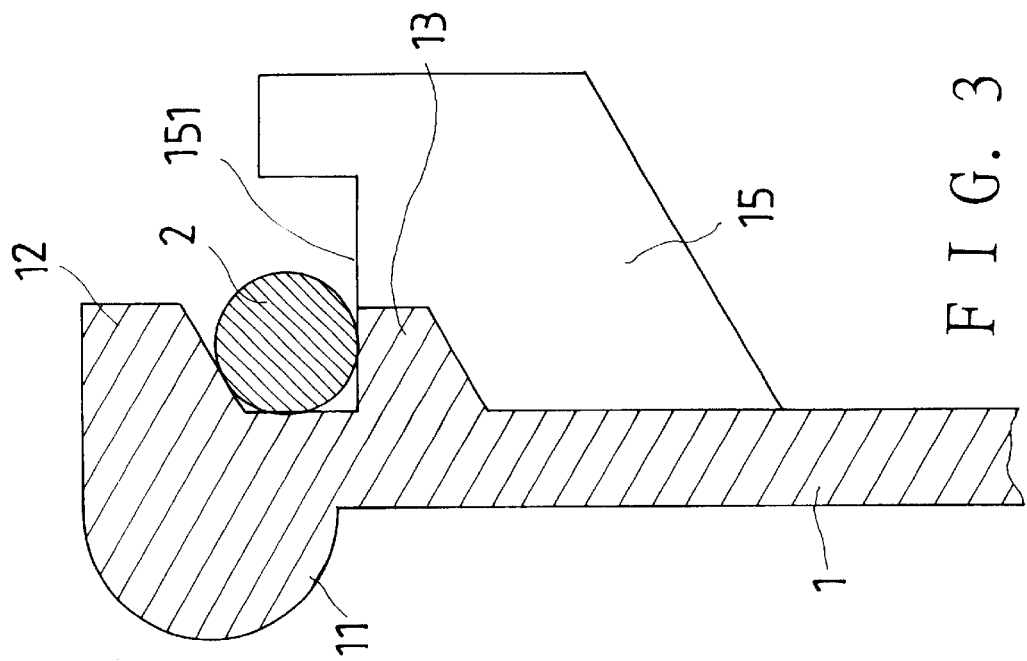
FIG. 3 is a cross-sectional view of the securing member for a steel ring of the present invention.
Figure 2:
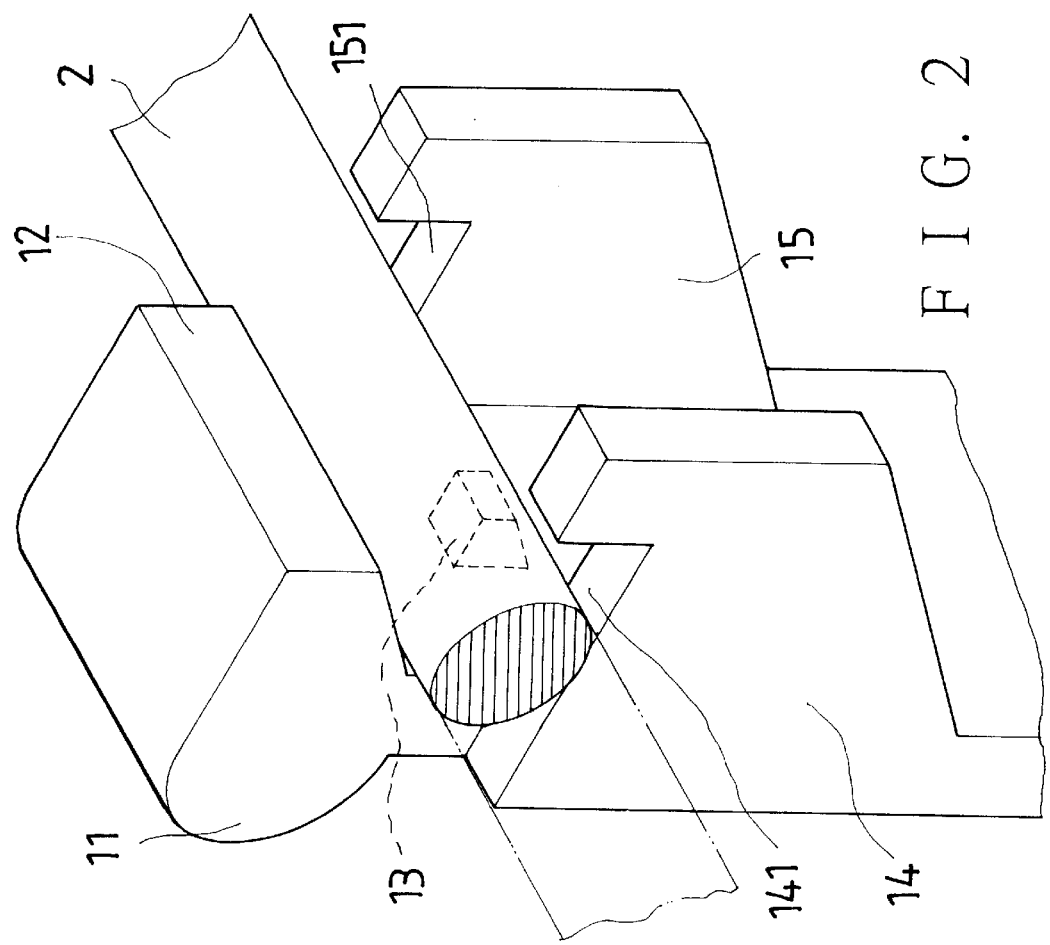
FIG. 2 is a perspective view of the securing member for a steel ring of the present invention.
Figure 4:
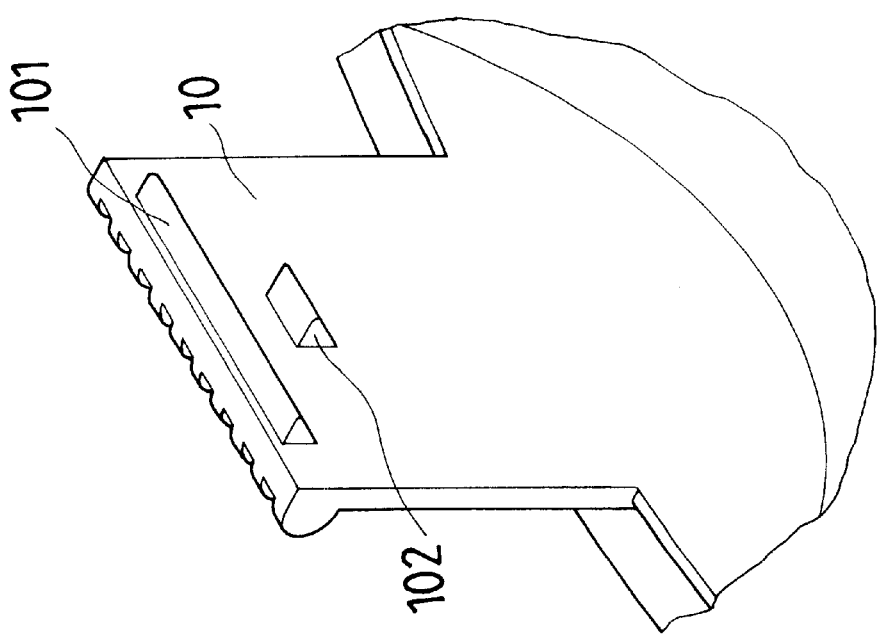
FIG. 4 is the first conventional securing member for a steel ring of a wheel cover.
Figure 5:
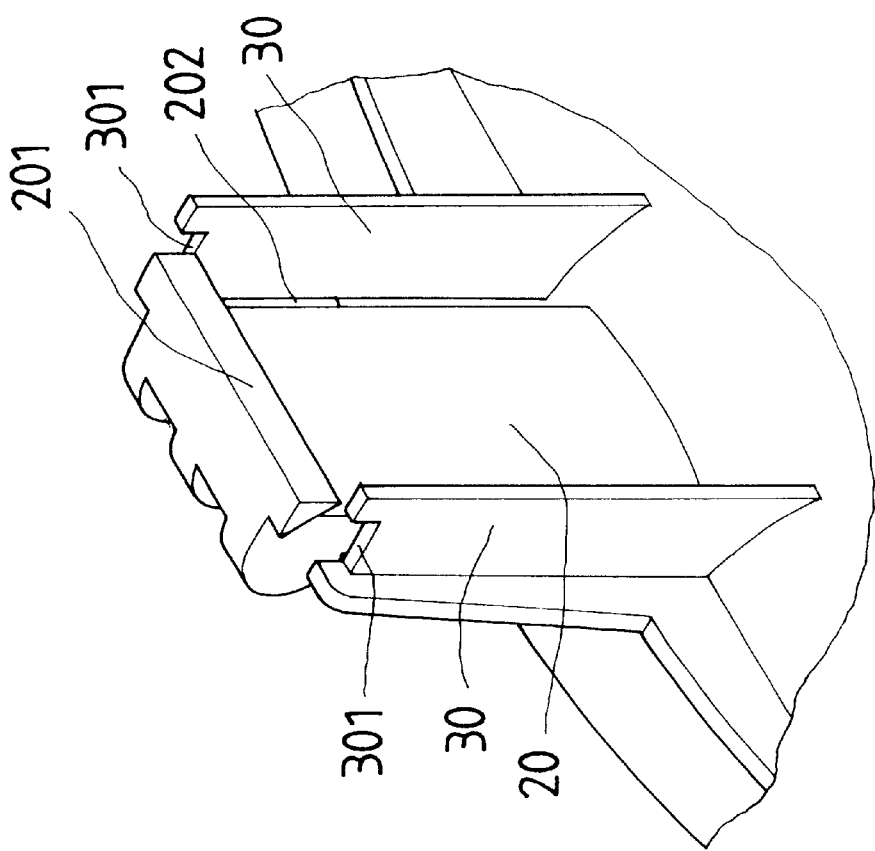
FIG. 5 is the second conventional securing member for a steel ring of a wheel cover.

Referring to FIGS. 1 and 2, a securing member for a steel ring of a wheel cover of the present invention has a main body, an outer connecting protrusion 11; an inner engaging protrusion 12, a confining block 13 and two lateral support plates 14, 15. The securing member 1 projects from an inner side of the wheel cover.

The main body is connected to the wheel cover form a bottom and two sides of a lower part. The outer connecting protrusion 11 is formed on a top end of an outer side of the main body. The inner engaging protrusion is formed on a top end of an inner side of the main body.

The lateral supporting plates 14, 15 each extends inwardly of the wheel cover from a respective side of the main body. The lateral supporting plates 14, 15 each has a gap 141, 151 on a top.

The confining block 13 is formed under the inner engaging protrusion 12, and is substantially as high as the gaps 141, 151.

The steel ring is fitted into a receiving space between the inner engaging protrusion 12 and the gaps 141, 151, and fixed in position by the inner engaging protrusion 12, the confining block 13 and the gaps 141, 151. Because the confining block 13 and the gaps 141, 151 have the same height, the steel ring can be supported stably on same.

Thus, the wheel cover can be fitted onto a wheel by inserting the securing members 1, and the steel ring into the wheel for the outer connecting protrusions 11 and the steel ring to engage inner side of the wheel.

From the above description, the securing member of the present invention can be known to have desirable features as follows.

1. The steel ring can be easily fitted onto the securing member, and securely located by the inner engaging protrusion, the confining block and the gaps without possibility of falling off even under violent movement.

2. When the steel ring is lifted onto the gaps, it cannot possibly fall between the lateral support plates and a central part of the securing member like the conventional securing member.

3. The securing member has a stronger connection to the wheel cover than the conventional one because it is connected to the wheel cover both from the bottom and two sides of the lower portion.

What is claimed is:

1. A securing member for a steel ring of a wheel cover, comprising a main body projecting from an inner side of said wheel cover, having an inner engaging protrusion on a top of an inner side thereof, two lateral supporting plates each extending inwardly of said wheel cover from said main body inner side; said lateral supporting plates each having a gap on a top to form a receiving space between said gaps and said inner engaging protrusion for said steel ring; and, a confining block formed on said inner side of said main body, said confining block being substantially as high as said gaps for confining each steel ring.

* * * * *